US009353832B1

(12) United States Patent
Hsia et al.

(10) Patent No.: US 9,353,832 B1
(45) Date of Patent: May 31, 2016

(54) APPARATUS WITH THE MULTI-STAGE POWER SHIFTING MEANS APPLIED TO A MACHINE TOOL

(71) Applicant: HUA YONG MACHINE INDUSTRY CO., LTD., Kaohsiung (TW)

(72) Inventors: Chao-Kun Hsia, Kaohsiung (TW); Chien-Jen Ho, Kaohsiung (TW)

(73) Assignee: Hua Yong Machine Industry Co., Ltd., Kaohsiung (TW)

( * ) Notice: Subject to any disclaimer, the term of this patent is extended or adjusted under 35 U.S.C. 154(b) by 50 days.

(21) Appl. No.: 14/565,610

(22) Filed: Dec. 10, 2014

(51) Int. Cl.
*F16H 3/64* (2006.01)
*B25B 21/00* (2006.01)
*B25F 5/00* (2006.01)
*F16H 63/18* (2006.01)

(52) U.S. Cl.
CPC ............... *F16H 3/64* (2013.01); *F16H 63/18* (2013.01); *F16H 2200/2007* (2013.01); *F16H 2200/2094* (2013.01)

(58) Field of Classification Search
CPC ............. F16H 2200/2007; F16H 2200/2094; F16H 63/18; F16H 3/005; F16H 2200/0039; B25B 21/00; B62M 6/40; B62M 6/45
See application file for complete search history.

(56) References Cited

U.S. PATENT DOCUMENTS

| | | | | |
|---|---|---|---|---|
| 5,984,821 A * | 11/1999 | Showalter | .......... | B60K 17/3467 475/204 |
| 6,390,487 B1 * | 5/2002 | Yoo | .......... | B62M 11/16 280/237 |
| 8,746,364 B2 * | 6/2014 | Atsumi | .......... | B25F 5/001 173/176 |
| 2001/0017066 A1 * | 8/2001 | Yaksich | .......... | B23B 31/1238 81/52 |
| 2005/0215385 A1 * | 9/2005 | Spielmann | .......... | B25F 5/001 475/298 |

* cited by examiner

*Primary Examiner* — Jacob S Scott
*Assistant Examiner* — Tinh Dang
(74) *Attorney, Agent, or Firm* — Rosenberg, Klein & Lee (57) ABSTRACT

An apparatus with the multi-stage power shifting means applied to a machine tool includes a housing body, a first transmission device and a second transmission device disposed in the housing body, a coupling device connected to the transmission devices and a controller controlling the gear shifting motion of the transmission devices. The controller includes two control units pivotally connected to respective engaging parts of the transmission devices and a driving system capable of moving the control units. When a power is sequentially transmitted from an external power source to the first transmission device, the coupling device, the second transmission device and then to a power transmission mechanism, the controller adjusts the mode of meshing the engaging parts with other correlated elements in the transmission devices to attain different output torque and speed values, the multi-stage shifting effect and the torque multiplying effect without increasing the bulk.

6 Claims, 7 Drawing Sheets

APPARATUS WITH THE MULTI-STAGE POWER SHIFTING MEANS APPLIED TO A MACHINE TOOL

BACKGROUND OF THE INVENTION

1. Field of the Invention

This invention relates to a transmission and relates particularly to an apparatus with the multi-stage power shifting means applied to a machine tool.

2. Description of the Related Art

A typical power transmission device on a machine tool has different designs for the power output, such as a single high torque design, a dual medium high torque design and a dual medium low torque design. The device with the dual shifting motion only provides two modes of output torque for use, so the single device cannot satisfy the need, and multiple alternate machine tools with different power output values are needed during a processing step. This alternate operation may decrease the processing efficiency of the machine tool. The processing mode of the machine tool is also restricted because of lack of insufficient variation of the power transmission. Furthermore, the gear construction of the device needs an increased bulk for increasing the gear reduction ratio, and this brings the device a quite big bulk. Therefore, an improvement is still needed.

SUMMARY OF THE INVENTION

An object of this invention is to provide an apparatus which is adapted to a machine tool and attains multiple output torque and speed values, a wide range of torque levels, and preferably the torque multiplying effect without increasing the bulk of the apparatus.

The apparatus with the multi-stage power shifting means of this invention comprises a housing body in which a first transmission device and a second transmission device are disposed, a coupling device connected to the two transmission devices and a controller controlling different gear shifting motions of the transmission devices. The first transmission device includes a first gear set connected to an external power source of a machine tool, a first internal gear meshing with the first gear set, a first fixing plate fixed to the housing body and a first engaging part capable of meshing with the first gear set, the first internal gear and the first fixing plate. The second transmission device includes a second gear set interacting with the first transmission device and driving a power transmission mechanism of the machine tool, a second internal gear meshing with the second gear set, a second fixing plate fixed to the housing body and a second engaging part capable of meshing with the second gear set, the second internal gear and the second fixing plate. The coupling device sends the power from the first transmission device to the second transmission device. The controller includes a first control unit and a second control unit pivotally and respectively connected to the first engaging part and the second engaging part and a driving system disposed in relation to the first control unit and the second control unit for moving the two control units. The two control units move the two engaging parts respectively under the control of the driving system. When the apparatus is mounted between the external power source and the power transmission mechanism, the power of the external power source is sequentially transmitted to the first transmission device, the coupling device, the second transmission device and thence to the power transmission mechanism. The controller changes the motion of meshing the engaging parts with other elements of the transmission devices, thereby attaining multiple output torque values with multiple speed ranges and providing a variable shifting effect and a wide range of torque levels. The torque multiplying effect can be attained in this invention as well.

Preferably, the first gear set includes a first sun gear connected to the external power source, a plurality of first planetary gears meshing with the first sun gear and the first internal gear, and a first arm support connected to the coupling device. The first planetary gears are pivotally disposed on the first arm support. The second gear set includes a second sun gear connected to the coupling device, a plurality of second planetary gears meshing with the second sun gear and the second internal gear, and a second arm support connected to the power transmission mechanism. The second planetary gears are pivotally disposed on the second arm support.

Preferably, the coupling device includes a first coupling portion connected to the first gear set and a second coupling portion connected to the first coupling portion and the second gear set.

Preferably, the driving system includes a shift lever in cooperation with the first control unit and the second control unit and a driving source connected to the shift lever for driving the shift lever. The shift lever defines two inclined slots thereon for insertions of the control units, and the control units are also pivotally and respectively connected to the engaging parts whereby the movement of the control units and the engaging parts can be controlled by the driving source.

Preferably, the coupling device includes a first coupling gear and a second coupling gear capable of meshing with the first engaging part and the second engaging part respectively. A first connecting gear is disposed on a peripheral wall of the first internal gear and capable of meshing with the first engaging part. A second connecting gear is disposed on a peripheral wall of the second arm support and capable of meshing with the second engaging part.

Preferably, the housing body includes a coupling flange on which the coupling device is pivotally disposed, two cases respectively disposed at two sides of the coupling flange for accommodating the first transmission device and the second transmission device respectively, and a box body accommodating the controller.

The advantages of this invention are more apparent to those skilled in the art upon reading following descriptions in conjunction with accompanying drawings.

DETAILED DESCRIPTION OF THE PREFERRED EMBODIMENTS

Figure 1:
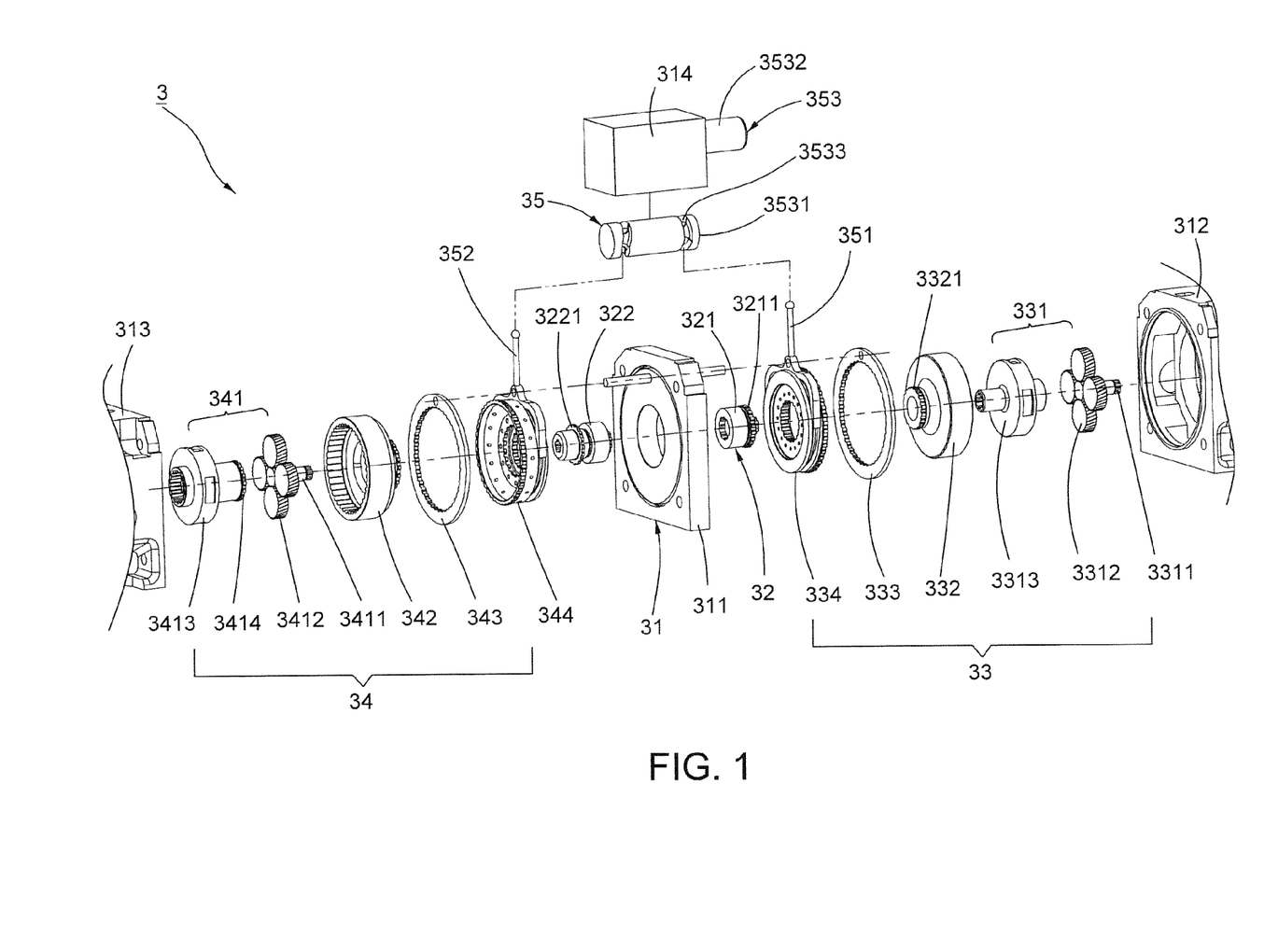
FIG. 1 is an exploded view showing a first preferred embodiment of this invention.
Figure 2:
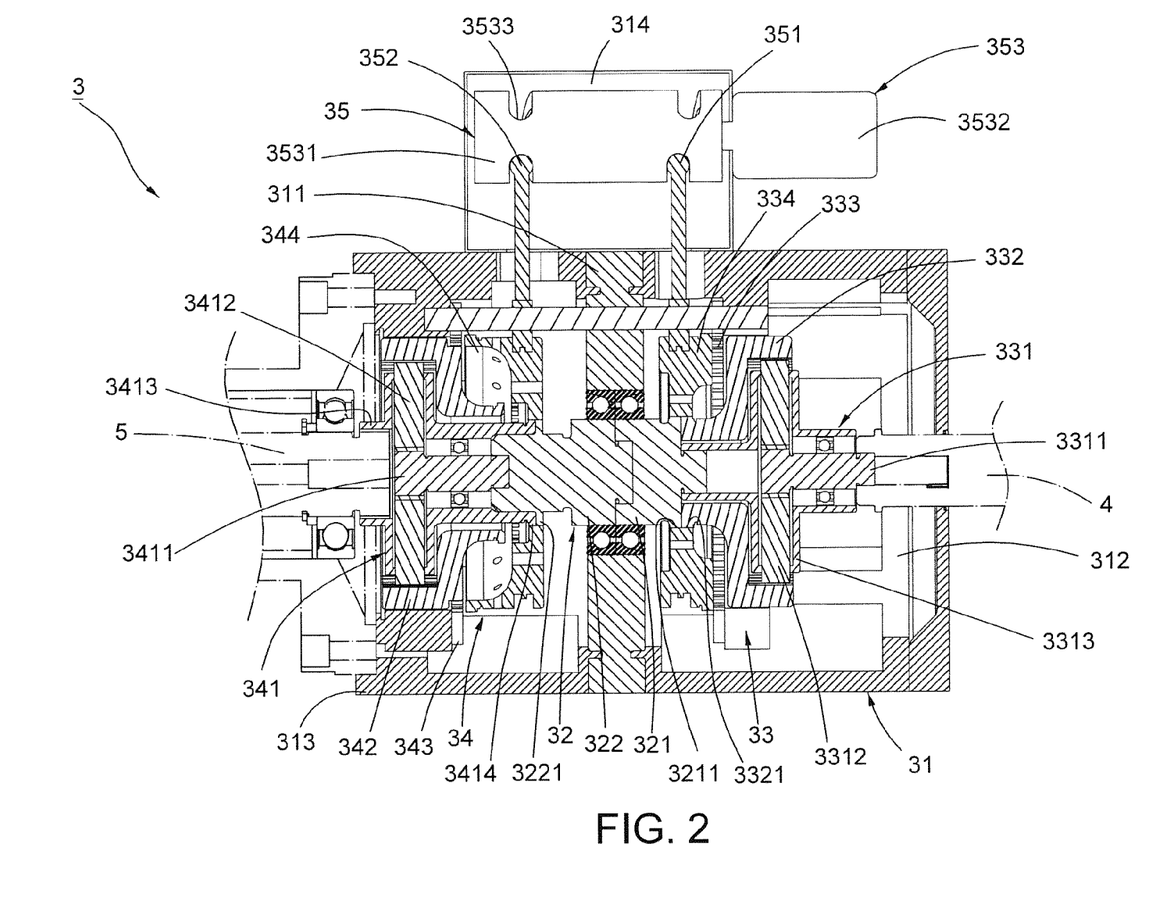
FIG. 2 is a cross-sectional view showing the first preferred embodiment of this invention.
Figure 3:
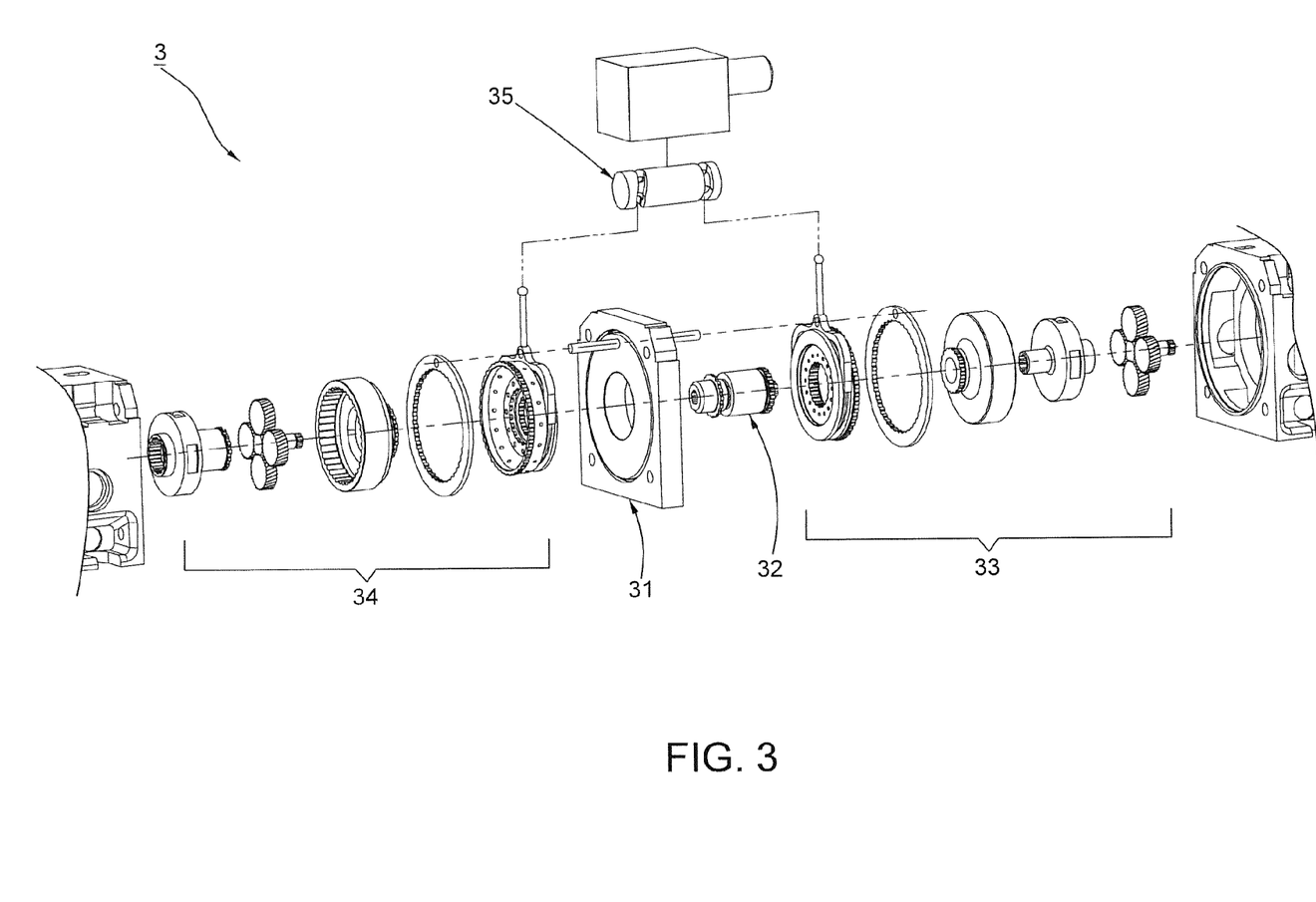
FIG. 3 is an exploded view showing a second preferred embodiment of this invention.

Referring to FIG. 1 and FIG. 2, an apparatus 3 with the multi-stage power shifting means of a first preferred embodiment of this invention is applied to a machine tool and is particularly mounted between an external power source 4 and a power transmission mechanism 5 of the machine tool. The external power source 4 can be a motor, an engine, etc. The power transmission mechanism 5 can be a transmission belt, a transmission axle, etc. The apparatus 3 comprises a housing body 31, a coupling device 32 disposed in the housing body 31, a first transmission device 33 and a second transmission device 34 respectively connected to two sides of the coupling device 32 and a controller 35 controlling different shifting motions of the transmission devices 33, 34. The coupling device 32 can be integrally formed as shown in FIG. 3. Alternatively, the coupling device 32, as shown in FIG. 1, can have a first coupling portion 321 connected to the first transmission device 33 and a second coupling portion 322 connected to the first coupling portion 321 and the second transmission device 34. As used herein, a first coupling gear 3211 and a second coupling gear 3221 can be respectively disposed on the peripheral walls of the first coupling portion 321 and the second coupling portion 322 of FIG. 1 or on the peripheral wall of the integrally-formed coupling device 32 of FIG. 3.

The first transmission device 33 includes a first gear set 331 connected to the external power source 4, a first internal gear 332 meshing with the first gear set 331, a first fixing plate 333 fixed to the housing body 31 and a first engaging part 334 capable of meshing with the first gear set 331, the first internal gear 332 and the first fixing plate 333. More particularly, the first gear set 331 can include a first sun gear 3311 connected to the external power source 4, a plurality of first planetary gears 3312 meshing with the first sun gear 3311 and a first arm support 3313 connected to the coupling device 32. In this embodiment, the first arm support 3313 is connected to the first coupling portion 321 of the coupling device 32. The first planetary gears 3312 are pivotally disposed on the first arm support 3313. The first planetary gears 3312 then mesh with the first internal gear 332. Further, a first connecting gear 3321 can be disposed on the peripheral wall of the first internal gear 332 and directed at the coupling device 32 to allow the first engaging part 334 to mesh with the first connecting gear 3321 and the first coupling gear 3211 concurrently.

The second transmission device 34 includes a second gear set 341 interacting with the coupling device 32 and the first transmission device 33 and driving the power transmission mechanism 5, a second internal gear 342 meshing with the second gear set 341, a second fixing plate 343 fixed to the housing body 31 and a second engaging part 344 capable of meshing with the second gear set 341, the second internal gear 342 and the second fixing plate 343. More particularly, the second gear set 341 can include a second sun gear 3411 connected to the coupling device 32, a plurality of second planetary gears 3412 meshing with the second sun gear 3411 and a second arm support 3413 connected to the power transmission mechanism 5. The second planetary gears 3412 are pivotally disposed on the second arm support 3413. The second planetary gears 3412 then mesh with the second internal gear 342. In this embodiment, the second sun gear 3411 is connected to the second coupling portion 322 of the coupling device 32. Further, a second connecting gear 3414 can be disposed on the peripheral wall of the second arm support 3413 and directed at the coupling device 32 to allow the second engaging part 344 to mesh with the second connecting gear 3414 and the second coupling gear 3221 concurrently.

The controller 35 includes a first control unit 351 pivotally connected to the first engaging part 334, a second control unit 352 pivotally connected to the second engaging part 344 and a driving system 353 controlling the movement of the first control unit 351 and the second control unit 352. To control the movement, the driving system 353 can be a claw clutch, a friction clutch, a synchronizing device or other suitable means. It is adopted in this embodiment that the driving system 353 includes a shift lever 3531 in cooperation with the first control unit 351 and the second control unit 352 and a driving source 3532 driving the shift lever 3531. The shift lever 3531 defines two inclined slots 3533 into which the control units 351,352 are inserted. Specifically, one end of the first control unit 351 is pivotally connected to the first engaging parts 334 and the other end thereof is inserted into one inclined slot 3533. One end of the second control unit 352 is pivotally connected to the second engaging part 344 and the other end thereof is inserted into the other inclined slot 3533. Therefore, the first control unit 351 and the second control unit 352 move the first engaging part 334 and the second engaging part 344 respectively by the driving system 353.

The housing body 31 includes a coupling flange 311 where the coupling device 32 is pivotally disposed, a first case 312 disposed at one side of the coupling flange 311 for accommodating the first transmission device 33, a second case 313 disposed at anther side of the coupling flange 311 for accommodating the second transmission device 34 and a box body 314 accommodating the controller 35. In this embodiment, the first coupling portion 321 and the second coupling portion 322 are pivotally disposed on the coupling flange 311, and the shift lever 3531 is received in the box body 314 as drawn.

Figure 4:
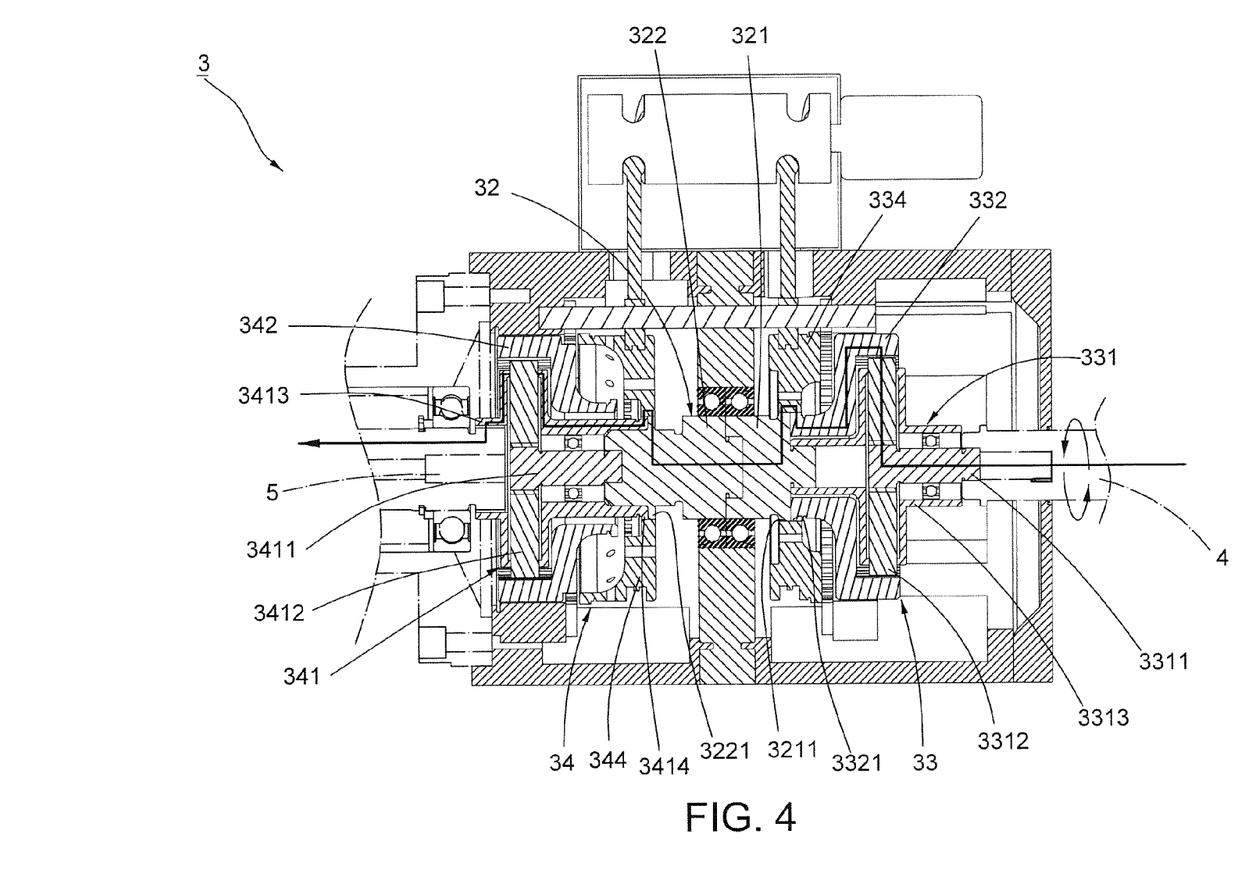
FIG. 4 is a schematic view showing this invention in a first operating mode.

The following descriptions will explain four operating modes showing changes in the meshing motion of elements for creating different output torque and speed values. A first operating mode of the apparatus 3 is explained with the aid of FIG. 4, the bold black line of which shows the meshing concatenation of correlated elements. When the external power source 4 rotates the first sun gear 3311, the first planetary gears 3312 is driven to rotate. The rotation of the first planetary gears 3312 also makes the first internal gear 332 and the first arm support 3313 rotate. Because the first engaging part 334 meshes with the first connecting gear 3321 and the first coupling gear 3211, the first engaging part 334, the first internal gear 332 and the coupling device 32 are driven to rotate synchronously. In this manner, a power of the external power source 4 is directly transmitted to the first coupling portion 321 of the coupling device 32. Then, the second coupling portion 322 of the coupling device 32 sends the power to the second transmission device 34. The second engaging part 344 meshes with the second coupling gear 3221 and the second connecting gear 3414, so the second engaging part 344, the second coupling portion 322, the second sun gear 3411, the second planetary gears 3412, the second arm support 3413 and the second internal gear 342 all rotate synchronously. The power transmitted by the first transmission device 33 is thus sent from the second arm support 3413 to the power transmission mechanism 5. In short, after the external power source 4 transmits the power, the first gear set 331, the first internal gear 332, the first engaging part 334, the first coupling portion 321, the second coupling portion 322, the second engaging part 344, the second gear set 341 and the second internal gear 342 have a synchronous rotation, thereby completing the first operating mode as an original mode.

Figure 5:
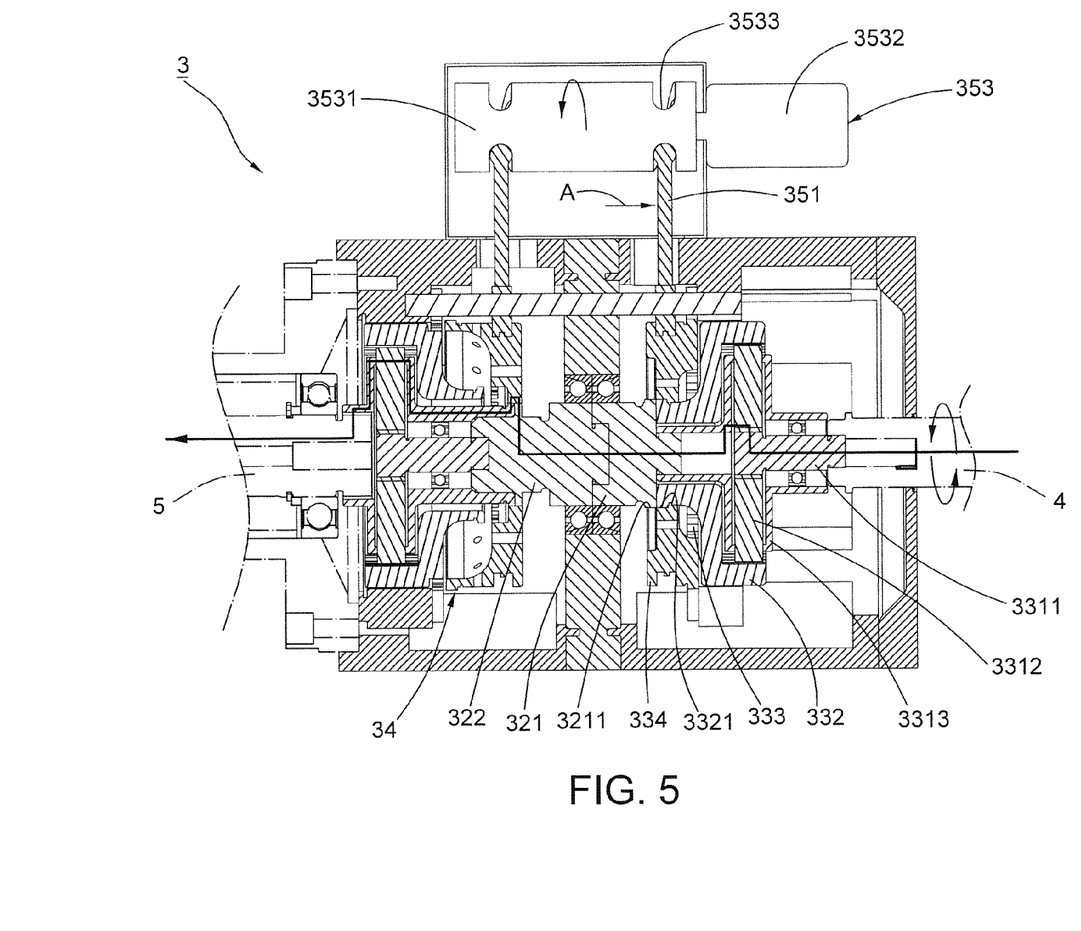
FIG. 5 is a schematic view showing this invention in a second operating mode.

A second operating mode of the apparatus 3 following the first operating mode is explained with the aid of FIG. 5. The second operating mode differs from the first operating mode in having a change in the first transmission device 33. More specifically, when the driving system 353 rotates the shift lever 3531 to a desired position, the first control unit 351 slides along the inclined slot 3533 and thus moves the first engaging part 334 towards the right as indicated by the arrowed line A. This movement moves the first engaging part 334 away from the first coupling gear 3211 of the first coupling portion 321, and the first engaging part 334 only meshes with the first connecting gear 3321 of the first internal gear 332. The first engaging part 334 also meshes with the first fixing plate 333. Therefore, the first internal gear 332 and the first engaging part 334 are fixed and positioned. This meshing relationship brings the following effect. When the external power source 4 rotates the first sun gear 3311, the power is sent to the first gear set 331 to rotate the first planetary gears 3312 that mesh with and rotate in the first internal gear 332. Because the aforementioned fixed state renders the first internal gear 332 unable to rotate, the first planetary gears 3312 in relation to the first internal gear 332 becomes a reducing state. Then, the first planetary gears 3312 drive the rotation of the first arm support 3313 whose other end is connected to the first connecting part 321 whereby the first coupling portion 321, the second coupling portion 322 and the second transmission device 34 are also actuated by the first arm support 3313. The detail relating to the operation of the second transmission device 34 of the second mode is identical to that of the first mode and herein is omitted. Consequently, the torque and rotating speed of the power transmission mechanism 5 in the second operating mode is different from that in the first mode.

Figure 6:
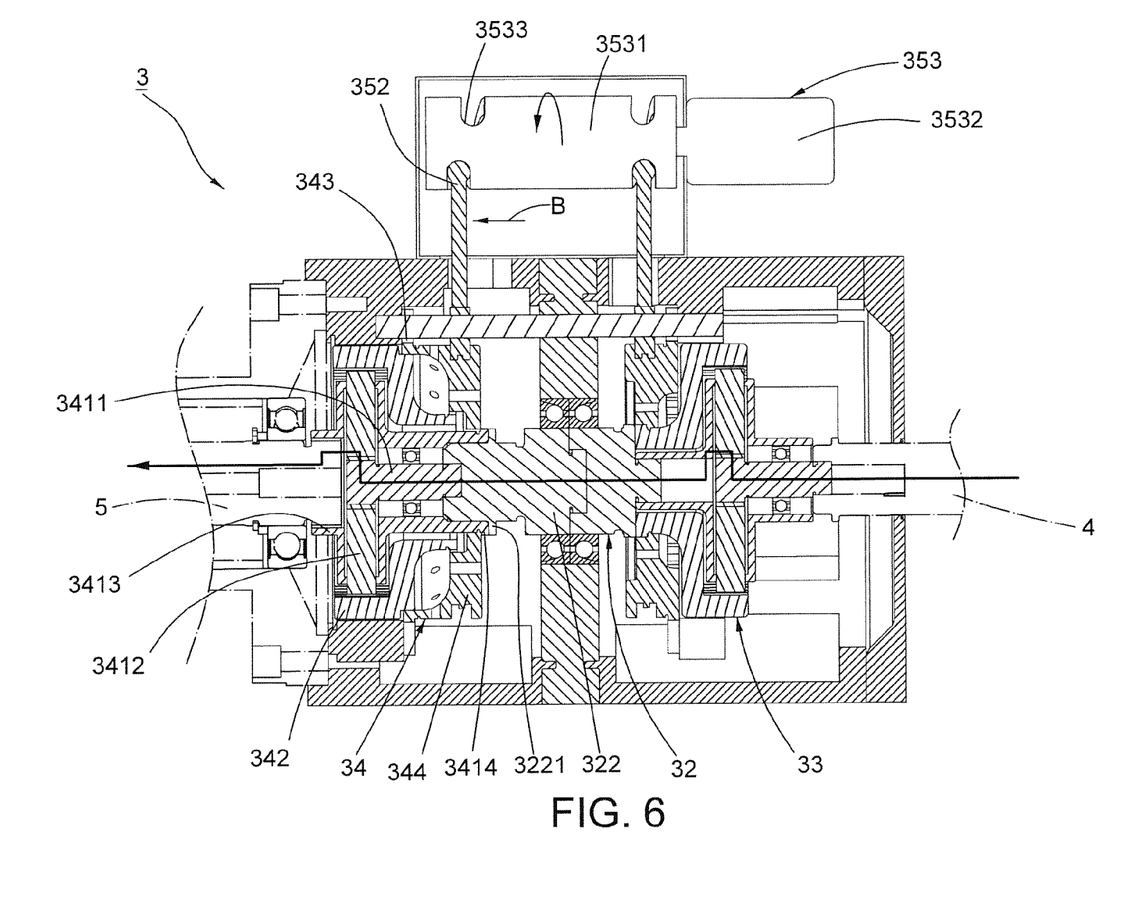
FIG. 6 is a schematic view showing this invention in a third operating mode.

A third operating mode of the apparatus 3 following the second operating mode is explained with the aid of FIG. 6. The third operating mode differs from the second operating mode in having a change in the second transmission device 34. More specifically, when the driving source 3532 of the driving system 353 rotates the shift lever 3531 to another desired position, the second control unit 352 slides along the inclined slot 3533 and thus moves the second engaging part 344 towards the left as indicated by the arrowed line B. In this manner, the second engaging part 344 is moved away from the second coupling gear 3221 and the second connecting gear 3414, and the second arm support 3413 is not driven by the second coupling portion 322 directly. Further, the second engaging part 344 meshes with the second internal gear 342 and then engages with the second fixing plate 343 whereby the second internal gear 342 and the second engaging part 344 are fixed and positioned. This meshing relationship brings the following effect. When the external power source 4 sends the power to the first transmission device 33, the coupling device 32 and thence to the second transmission device 34, the second coupling portion 322 only drives the rotation of the second sun gear 3411. The rotation of the second sun gear 3411 also rotates the second planetary gears 3412 and the second arm support 3413. Because the second internal gear 342 is not driven by the second planetary gears 3412, the second planetary gears 3412 is affected by the meshing force of the second internal gear 342 to attain the reduction. In other words, the second internal gear 342 does not rotate whereby the second planetary gears 3412 meshing with and rotating in the second internal gear 342 becomes a reducing state. Further, the second arm support 3413 drives the power transmission mechanism 5 to define the third operating mode whose torque value and rotating speed is different from those of the first mode and the second mode. Especially, this operating mode is carried out when the gears of the first transmission device 33 maintains its shifting state and then the second transmission device 34 subjects the power from the first transmission devices 33 to a further shifting motion, and this effects the torque multiplication without increasing the bulk of the gear construction. Therefore, the bulk of the apparatus 3 can be lessened.

Figure 7:
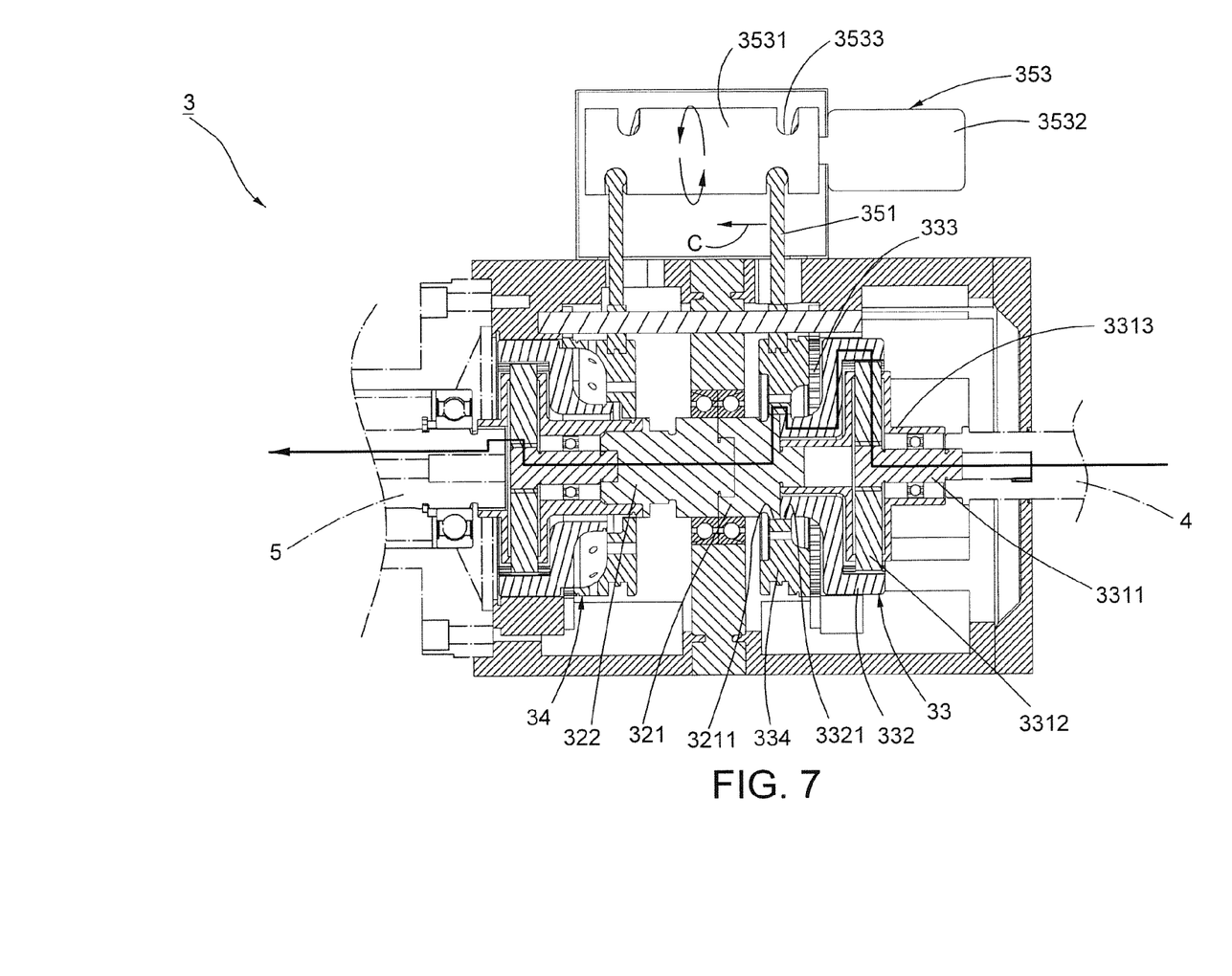
FIG. 7 is a schematic view showing this invention in a fourth operating mode.

A fourth operating mode of the apparatus 3 following the third operating mode is explained with the aid of FIG. 7. The fourth operating mode differs from the third operating mode in having a change in the first transmission device 33. More specifically, when the driving source 3532 rotates the shift lever 3531 to another desired position, the first control unit 351 slides along the inclined slot 3533 and thus moves the first engaging part 334 towards the left as indicated by the arrowed line C to move the first engaging part 334 away from the first fixing plate 333. In this manner, the first engaging part 334 meshes with the first coupling gear 3211 and the first connecting gear 3321 simultaneously to render the first internal gear 332 able to interact with the first coupling portion 321 of the coupling device 32. Accordingly, when the first transmission device 33 is actuated by the external power source 4, the first sun gear 3311 makes the first planetary gears 3312 rotate. The rotation of the first planetary gears 3312 also makes the first internal gear 332 and the first arm support 3313 rotate. Because the first engaging part 334 meshes with the first connecting gear 3321 and the first coupling gear 3211 concurrently, the first internal gear 332 and the first coupling portion 321 interact together to sent the power to the second coupling portion 322, the second transmission device 34 and thence to the power transmission mechanism 5. Therefore, the fourth operating mode is carried out, and the torque value and rotating speed of this mode is different from those of the above three modes.

To sum up, this invention includes two transmission devices disposed in the housing body and the coupling device effecting the power transmission between the transmission devices. The controller controls different meshing motions of the elements of the transmission devices respectively, thereby providing multiple output torque values and speed ranges and obtaining a multi-stage shifting effect and a wide range of torque levels. If the first transmission device maintains the shifting state and the second transmission device makes a further shifting motion, the torque multiplying effect can be attained without increasing the bulk of the apparatus.

While the embodiments of this invention are shown and described, it is understood that further variations and modifications may be made without departing from the scope of this invention.

What is claimed is:
1. An apparatus with a multi-stage power shifting means being mounted between an external power source and a power transmission mechanism of a machine tool, said apparatus comprising:
  a housing body;
  a first transmission device disposed in said housing body, said first transmission device including a first gear set connected to said external power source, a first internal gear meshing with said first gear set, a first fixing plate fixed to said housing body and a first engaging part capable of meshing with said first gear set, said first internal gear and said first fixing plate;
  a second transmission device disposed in said housing body, said second transmission device including a second gear set interacting with said first transmission device and driving a rotation of said power transmission mechanism, a second internal gear meshing with said second gear set, a second fixing plate fixed to said housing body and a second engaging part capable of meshing with said second gear set, said second internal gear and said second fixing plate;
  a coupling device disposed in said housing body and respectively connected to said first transmission device and said second transmission device whereby said cou- pling device transmits a power of said external power source from said first transmission device to said second transmission device; and a controller comprising a first control unit pivotally connected to said first engaging part, a second control unit pivotally connected to said second engaging part and a driving system disposed in relation to said first control unit and said second control unit for controlling movement of said first control unit and said second control unit.

2. The apparatus with the multi-stage power shifting means as claimed in claim 1, wherein said first gear set includes a first sun gear connected to said external power source, a plurality of first planetary gears meshing with said first sun gear and said first internal gear, and a first arm support connected to said coupling device, said first planetary gears being pivotally disposed on said first arm support, said second gear set including a second sun gear connected to said coupling device, a plurality of second planetary gears meshing with said second sun gear and said second internal gear, and a second arm support connected to said power transmission mechanism, said second planetary gears being pivotally disposed on said second arm support.

3. The apparatus with the multi-stage power shifting means as claimed in claim 1, wherein said coupling device includes a first coupling portion connected to said first gear set and a second coupling portion connected to said first coupling portion and said second gear set.

4. The apparatus with the multi-stage power shifting means as claimed in claim 1, wherein said driving system includes a shift lever having two inclined slots formed thereon and a driving source connected to said shift lever for driving said shift lever, said first control unit and said second control unit being respectively inserted into said inclined slots.

5. The apparatus with the multi-stage power shifting means as claimed in claim 2, wherein said coupling device includes a first coupling gear and a second coupling gear capable of meshing with said first engaging part and said second engaging part respectively, a first connecting gear being disposed on a peripheral wall of said first internal gear and capable of meshing with said first engaging part, a second connecting gear being disposed on a peripheral wall of said second arm support and capable of meshing with said second engaging part.

6. The apparatus with the multi-stage power shifting means as claimed in claim 1, wherein said housing body includes a coupling flange on which said coupling device is pivotally disposed, two cases respectively disposed at two sides of said coupling flange for accommodating said first transmission device and said second transmission device respectively, and a box body accommodating said controller.

* * * * *